United States Patent
Weitzel

(10) Patent No.: US 7,466,421 B2
(45) Date of Patent: Dec. 16, 2008

(54) DIFFRACTIVE INTERFEROMETRIC OPTICAL DEVICE FOR MEASURING SPECTRAL PROPERTIES OF LIGHT

(75) Inventor: Thilo Weitzel, Tübingen (DE)

(73) Assignee: CAMPus Technologies AG, Ipsach (CH)

( * ) Notice: Subject to any disclaimer, the term of this patent is extended or adjusted under 35 U.S.C. 154(b) by 156 days.

(21) Appl. No.: 10/521,516

(22) PCT Filed: Jul. 15, 2002

(86) PCT No.: PCT/EP02/07861

§ 371 (c)(1), (2), (4) Date: Jan. 18, 2005

(87) PCT Pub. No.: WO2004/008092

PCT Pub. Date: Jan. 22, 2004

(65) Prior Publication Data
US 2005/0248769 A1    Nov. 10, 2005

(51) Int. Cl.
*G01B 9/02* (2006.01)
(52) U.S. Cl. .................. 356/451; 356/454; 356/455
(58) Field of Classification Search ......... 356/451–456, 356/328
See application file for complete search history.

(56) References Cited

U.S. PATENT DOCUMENTS 5,059,027 A * 10/1991 Roesler et al. ............. 356/456
5,777,736 A * 7/1998 Horton ...................... 356/456
5,933,235 A * 8/1999 Sampei et al. .............. 356/328
6,362,879 B1 * 3/2002 Ranalli ...................... 356/328
6,687,007 B1 * 2/2004 Meigs ........................ 356/456

FOREIGN PATENT DOCUMENTS

| DE | 293893 | 9/1991 |
| FR | 2782383 | 2/2000 |
| JP | 04-055726 | 2/1992 |
| NL | 1014807 | 10/2001 |
| WO | WO 00/62026 | 10/2000 |

OTHER PUBLICATIONS

Giovannini et al., "Interferometric configuration based on a grating Interferometer for the measurement of the phase between TE and TM polarizations after diffraction by gratings," Optical Letters, vol. 20, No. 21, Nov. 1995, pp. 2255-2257.
Giuliani et al., "Spectral characteristics of laser cavities employing multipass grating interferometers as output couplers," J. Opt. Soc. Am.B., vol. 4, No. 11, Nov. 1987, pp. 1781-1789.

* cited by examiner

*Primary Examiner*—Samuel A Turner
(74) *Attorney, Agent, or Firm*—Dilworth & Barrese LLP

(57) ABSTRACT

A diffractive interferometric optical device is provided for measuring spectral properties of light. The device includes means for coupling in a single spatial mode of an incoming light field to be examined, means for splitting the single spatial mode of incoming light field into at least two partial fields, means for changing one of a shape or a direction of propagation of the wavefront of at least one of the at least two partial fields in dependence on the wavelength and means for generating an interference pattern superimposing the at least two partial fields. The device further comprises detection means to record and evaluate the interference pattern at a plurality of discrete spatial positions in order to derive spectral properties of the incoming light field.

39 Claims, 8 Drawing Sheets

DIFFRACTIVE INTERFEROMETRIC OPTICAL DEVICE FOR MEASURING SPECTRAL PROPERTIES OF LIGHT

BACKGROUND OF THE INVENTION

1. Field of the Invention

The invention relates to apparatus and methods related to optical spectroscopy and to optical sensors.

2. Description of the Related Art

Optical spectrometers can be generally divided into dispersive or diffractive spectrometers and Fourier transform spectrometers. Dispersive (prism) spectrometers or diffractive (grating) spectrometers break down the incident light beam into its spectral components by the wavelength dependence of an angle of deflection or of an angle of reflection. The different spectral components are thereby spatially separated and the spectral component to be determined can be selected (monochromator). The detection of a spectrum then takes place with the help of moving parts in that the different spectral components are selected and measured in succession.

Monchromators are most common with a Czerny-Turner beam path, i.e. with a rotatable planar grating (diffraction grating in reflection) between an entry slit and an exit slit and collimator mirrors or collector mirrors independent of one another. The collimator and collector effect an imaging of the entry slit in the plane of the exit slit. The diffraction grating is located in the Fourier transform plane of this imaging system.

The development of spatially resolving detectors (CCD, diode array) now permits the simultaneous measurement of all spectral components in that a separate element of the detector is provided for each spectral component. Such an arrangement (polychromator) manages without any moving parts and utilizes the available incident light substantially more efficiently.

Fourier transform spectrometers are based on an interferometer in which the difference of the optical path lengths of the partial beams brought to interference can be set with high precision. The spectrum can be determined by Fourier transformation from a measurement of the interference signal via a suitable range of path length differences.

Instruments are normally set up in the manner of a Michelson interferometer or of a Twyman-Green interferometer. The mechanical components for the setting of the optical path lengths by moveable mirrors or tiltable mirror pairs and the required collimator for the generation of planar wavefronts are above all technically demanding here.

A further variant of spectrometers uses static interference patterns generated by light beams which are brought to interference at a specific angle, e.g. Fizeau interferometers. The spectrum can be calculated by counting the interference stripes or via a determination of the spatial frequencies of the interference pattern with the help of a numerical Fourier transformation.

The fact is disadvantageous for these interferometric spectrometers (both for Michelson/Twyman Green interferometers with variable wavelengths and for static interferometers with spatial interference patterns) that the relative spectral resolution is determined directly by the number of the line pairs (Fizeau stripes) measured in the interference patterns. If N line pairs are counted for a specific wavelength $\lambda$, the spectral resolution lies in the order of magnitude of $\lambda/N$.

A more recent variant of Fourier transform spectrometers ("spatial heterodyne spectrometers") uses dispersive or diffractive optical elements (diffraction gratings) in order to change the angle between two collimated partial beams of a static interferometer as a function of the wavelength and so to increase the spectral resolution.

The superposition of planar wavefronts is necessarily required here to obtain Fizeau interferograms (Fizeau stripes) which can be broken down into their spectral components by a numerical Fourier transformation after the measurement.

Such arrangements are furthermore based on the translation invariance of the optical Fourier transformation. The incident light is first collimated by a collimator. The collimated beam (planar wavefronts) is divided (amplitude division) and guided over spectrally dispersive or diffractive elements, e.g. over a diffraction grating. The spectrally dispersive optical element lies in the Fourier plane of the collimator in this process. The partial beams, which are superposed again, are then imaged through a collector and a further Fourier transform lens such that a spatially resolving detector again comes to rest in a Fourier transform plane of the entry aperture.

Such arrangements—like Fourier transform spectrometers or conventional monochromators—are therefore dependent on imaging optical systems of high quality. Relatively large focal lengths of the optical systems are in particular required.

The possible performance capability of dispersive or diffractive spectrometers depends on specific parameters, in particular on the dimensions of the entry slit or the exit slit, on the focal length and aperture of the imaging elements and on the properties of the dispersive or diffractive element itself. Modem instruments almost reach these physically set limits.

The possible performance capability of Fourier transform spectrometers is correspondingly determined by specific parameters, and here in particular by the range and the increment for the variation of the optical path lengths. The performance capability of Fourier transform spectrometers greatly surpasses the possibility of dispersive or diffractive spectrometers.

Fourier transform spectrometers can also almost reach the physical limits of their performance capability, but the technical effort is very high in many cases. Since Fourier transform spectrometers are based on an interferometer, all optical components, and in particular also the moving parts, must be produced and positioned with a precision of fractions of the wavelengths to be measured.

Spatially heterodyne spectrometers are technically less complex, but likewise need both imaging optical components of high quality and dispersive or diffractive optical components of high quality.

The spectral resolution $d\lambda$ at a wavelength $\lambda$ of all named spectrometers is directly related to a corresponding coherence length $l=\lambda^2/d\lambda$.

To achieve a specific spectral resolution, the spectrometric arrangement must generate defined differences of the optical path lengths of at least the range $l$.

The necessity of a collimation of the incident light is thus common to all named spectrometers. The collimator is an imaging optical element of a specific focal length f, e.g. a concave mirror or a lens. The entry aperture of the spectrometer is located at the focal point of the collimator.

The spectrometers now explicitly utilize the special properties of the optical Fourier transformation, in particular the translation invariance of the Fourier transformation, i.e. the transformation of a translation in the focal plane to a change of the direction of propagation in the Fourier plane of the collimator.

Monochromators ("4f system" with focal length f: entry slit-f-collimator-f-diffraction grating-f-collector-f-exit slit) influence the propagation direction of the light in the Fourier plane of the imaging system by means of a diffraction grating and thus generate the desired spectral dispersion without essentially disturbing the imaging of the entry slit onto the exit slit or detector (with 1 being defined by the geometry of the grating in the beam path, f>>1). The collimator carries out an optical Fourier transformation, the collector takes over the optical retransformation and thus effects the optical imaging of the entry slit into the plane of the exit slit or of the detector.

Fourier transform spectrometers (2f system) necessarily require the collimator (as a rule with f substantially larger than 1) to maintain the interference despite optical paths of different lengths, i.e. to superpose the wavefronts suitably at the detector. The translation invariance of the Fourier transformation is in particular utilized here.

With a Fourier transform spectrometer, the numerical Fourier transformation replaces the optical retransformation used with the monochromator.

Fourier transform spectrometers with dispersive elements, which evaluate a spatial interference pattern (spatially heterodyne spectrometers) explicitly require the collimator in the context of an optical Fourier transformation, on the one hand to avoid a blurring of the interference patterns despite a finitely large entry opening (translation invariance), on the other hand to establish the defined and unambiguous relationship between the optical spectrum and corresponding spatial frequencies in the resulting pattern which forms the basis for the numerical retransformation.

These spectrometers moreover require an additional optical imaging system ("6f system": entry slit-f-collimator-f-interferometer with diffraction grating-f-collector-f-exit diaphragm-f-imaging element-f-detector plane).

Since both interferometric arrangements and systems imaging at high resolution have to be realized through high-quality optical systems, with large focal lengths as required, and since a minimum size of the components or of the path lengths is fixedly predetermined by the aforesaid value 1—in dependence on the respective exact arrangement, the technical effort increases quickly as the demands on the spectral resolution grow. A characterizing parameter here is the so-called spectral aperture broadening which occurs despite collimation.

SUMMARY OF THE INVENTION

Therefore, the present invention has been made in view of the above problems. Accordingly, the present invention provides an interferometric apparatus and a method of use. The interferometric apparatus having high spectral resolution using low quality optical components.

The coupling of the incoming light limited to a few defined spatial modes or a single spatial mode via a mono-mode coupling is important for the realization of a cost-effective and spectrally highly resolving spectrometer or sensor in accordance with the invention. The aperture broadening disappears under these circumstances; the interference pattern in particular also remains recognizable without an optical Fourier transformation through a collimator and can be evaluated with the help of the methods shown.

In combination with dispersive or diffractive optical elements for the wavelength-dependent influencing of the wavefronts, such an optical spectrometer permits very much more compact and more flexible designs than previous approaches using imaging optical elements.

The illustrated measuring process or the illustrated method for the orthogonalization of the measured interference patterns is a requirement for the function of such designs since they cannot be evaluated directly with the help of a numerical Fourier transformation.

According to one aspect, the invention comprises an apparatus which combines dispersive or diffractive optical elements with an interferometer and with the coupling in of a single spatial mode of light whose spectral properties shall be determined. The apparatus further comprises a detector which can measure the intensity of the resulting interference pattern at a plurality of spatial positions in combination with means to analyze the measured intensities in order to derive spectral properties of the light copled in.

According to another aspect, a method is provided which permits the spectrum of the incident light, or direct measured values, which can be derived from such a spectrum, to be reconstructed from an interference pattern measured as a series of measured values. In accordance with the method, an interference pattern is interpreted as a series of measured values. The series of measured values may be considered as a vector in the context of linear algebra. More particularly, the vector may be considered as an element of a discrete space of the corresponding dimension.

A key feature of the invention is that the interference patterns of respectively different spectral components of a spectral range to be examined differ strongly from one another. An interference pattern associated with a specific spectral component in the spectral range is defined herein as a base pattern. Base patterns may be determined either by calculation or by measurement. The base patterns can be considered in one dimension or in two dimensions. Base patterns are initially interpreted as linearly independent base vectors of said discrete space in the context of linear algebra. An interference pattern generated by the apparatus of the invention is considered as a superposition of a plurality of different base patterns, where each base pattern is defined as an particular interference pattern associated with a spectral component in the spectral range of an input light source.

The recording of the interference pattern takes place by the detector by the measurement of the intensities at a large number of discrete spatial positions. An interference pattern is therefore in each case present in the form of a fixed number of (measured) values. The precision and available spatial frequencies follow according to the sampling theorem.

The particular advantages of the invention include a high-resolution and very compact optical spectrometer apparatus. The features of high-resolution and compactness result from an optical mono-mode coupling which guarantees unlimited spatial coherence without any need to employ optical arrangements involving e.g. the translation invariance of the Fourier transform. This fact also precludes the need for a collimator. The apparatus can therefore be advantageously realized fully without the use of imaging optical elements. Moreover, the described methods utilize the fact that a numerical retransformation of the interference signal for the sought spectrum measured at the detector i.e. an mathematical one-to-one relation from optical spectra of incoming light to the resulting measured interference pattern can be found, at least approximately, for almost any sufficiently complex optical transformations.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION OF THE PREFERRED EMBODIMENTS

I. Introduction

Figure 1:
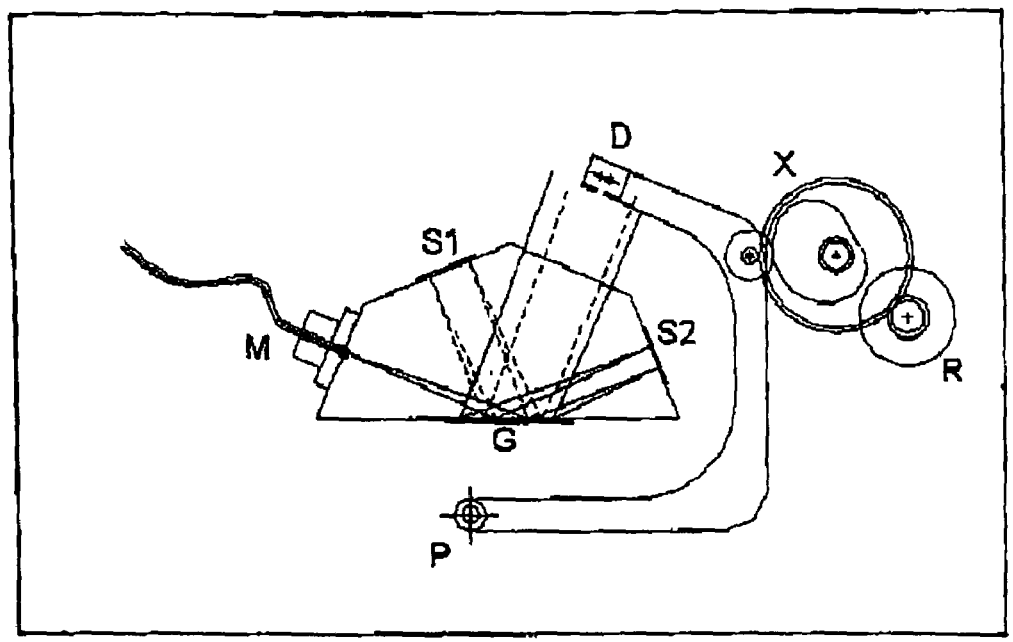
FIG. 1 illustrates an extremely compact arrangement of the apparatus of the invention with the optical components being integrated in a monolithic glass block, according to one embodiment.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally details concerning network communications, electric signaling techniques, and the like, have been omitted inasmuch as such details are not considered necessary to obtain a complete understanding of the present invention and are considered to be within the understanding of persons of ordinary skill in the relevant art.

II. Definitions

The method can be realized in different variants; we will introduce the following definitions for the discussion:

S: is a spectrum, represented by discrete spectral components of a specific intensity, i.e. as a vector with the components $s_{nn}:1 \ldots N$. s comprises a specific spectral range of the optical spectrum; the individual components are spectrally close with relation to the considered spectral resolution.

i: is an interference pattern measured at the detector. i is thus a vector which e.g. represents the individual elements of an array detector represented by the components $i_m$ $M:1 \ldots M$.

O: is the spectrum reconstructed as the measurement result by the method or a vector which directly represents the measured values derived from a spectrum, represented in accordance with s by components $o_k:1 \ldots K$. In case o represents a spectrum as a rule with K=N.

T: is an optical transformation which can be represented as a matrix by T s=i. The evaluation is first represented as a retransformation R by Ri=o.

Under very favorable circumstances (good signal/noise ratio, fixed phase position, "spectrally closely" distributed base patterns), a direct (approximate) calculation of R could take place as the inverse of T. o is then (approximately) equal to s.

The components (vectors) of the matrix T can be determined with reference to the relationship $Te_n = t_n$, where the $e_n$ are the unit vectors of the spectral components. The possibility is now particularly interesting of actually generating the spectral components $e_n$, for instance, with the help of a monochromatic reference light source and to determine the $t_n$ and thus the matrix T by experiment (i.e. reference measurement or calibration measurement).

As a rule, a determination of R by inversion of the (measured) matrix T is not possible, but the retransformation can take place approximately with known $t_n$ by a correlation. Different correlation methods are possible; a common method is "cross-correlation" based on the scalar product of the discrete Fourier transformation of the respective sequences or vectors to be compared. Using the discrete Fourier transformation, F, o and thus approximately s can be calculated as $o_n = |F(i)F^{-1}(t_n)|$.

In case the optical transformation is an exact Fourier transformation, only one component of the expression $F^{-1}(t_n)$ will be not equal to 0, namely the one which represents the respectively corresponding spatial frequency and thus directly represents a spectral component of the spectrum. The base vectors $t_n$ are here not only linearly independent, but also orthogonal and moreover form the unit vectors of the spatial frequencies. The calculation of o is therefore reduced for precisely this special caw to the Fourier transformation of i.

However, the following two possibilities are deserving of particular interest:

The properties of the optical transformation can be similar to those of a Fourier transformation or the optical transformation can be completely irregular, i.e. form so-called "speckle patterns" ("granulation").

The first case can be represented by a severely erroneous optical Fourier transformation, for instance produced by an optical arrangement in accordance with the invention without a collimator and with very cost-effective optical elements. The base patterns are thus still linearly independent due to the systematic generation, but only approximately orthogonal.

The second case can be represented by an optical arrangement in accordance with the invention with an interferometer based on a scratched piece of broken glass (extremely cost-effective). The base vectors can here be assumed to be statistically distributed.

For the first case, the method represents a correction, i.e. the poor quality of the optical transformation can be compensated to a very large extent by an adapted retransformation.

In the second case, the spectrum is determined by a purely statistical correlation of the measured values with the base vectors. In this case, a high number of elements of the detector should be assumed. It is in particular favorable to select M to be very much larger than N, for instance by using a two-dimensional detector array. The base patterns are not linearly independent due to their statistical nature. The correlation for large values of N nevertheless shows good results. Very good results are achieved for very large values of M, since in this case, i.e. of the statistical distribution of N base vectors in an M-dimensional space, the base vectors are at least approximately linearly independent.

In this context, different correlation functions for the method can also be considered, in particular stochastic correlations.

A advanced calculation or refining of the results by deconvolution is particularly advantageous, provided that the selected method can be applied to a set of different transfer functions.

In a use of the arrangement in accordance with the invention as a sensor, it can be advantageous not to look for the spectrum as the result of the calculations, but rather directly for the sought measurand.

For a chemosensor, the base vectors are then not determined by measurement of spectral components, but by recording spectra of the sought substances. A base vector, and thus a component of the result vector, thus does not represent an individual spectral component, but rather directly the sought measured value, i.e. e.g. the concentration of a specific substance corresponding to an optical absorption spectrum.

The same applies accordingly, for instance, to the measurement of layer thicknesses using the characteristic spectral modulation of light transmitted or reflected by thin films.

This adaptive procedure permits the realization of optical sensors for a plurality of applications. The evaluation of the measurements by correlation with previously recorded base patterns permits the direct determination of the sought values without the detour via an analysis of the optical spectrum.

Provided that the interference patterns, i.e. the base patterns for the spectral components in question, are linearly independent within the framework of the resolution and precision of the measurement, the respective spectral components of the incident light, and thus the spectrum, can be determined by correlation of the respective base patterns with the recorded interference patterns.

Provided that the properties of all components of the apparatus are determined with sufficient precision, the required set of base patterns can be calculated.

The possibility is particularly interesting of measuring a set of base patterns for the respective specific design of the apparatus with the help of a suitable adjustable monochromatic reference light source. Since the base patterns in this case already include all types of optical aberration occurring in the respective apparatus, the demands on the optical quality of the components of the apparatus are relatively low, provided that the base patterns remain approximately linearly independent.

With Fourier transform spectrometers, the recorded "perfect" interference patterns are linearly independent (superposition of sinusoidal components) and the Fourier transformation represents an orthogonalization method. The individual Fourier coefficients represent the spectral components of the measured spectrum.

Unlike the prior art which relies on a direct Fourier transformation of the recorded interference patterns instead, the invention relies on an orthogonalization with respect to the spectral components after a suitable transformation of the recorded interference patterns. To this end the relative path length difference of the partial beams brought to interference must be determined for each measured point.

In accordance with a preferred aspect of the invention, the interference pattern can be generated using well-known interferometers which divide the amplitude of the incident light, with the help of a semi-transmitting mirror or of a suitable grating (optionally into more than two partial beams) and a subsequent superposition of the partial fields at the location of the detector. Those knowledgeable in the art may contemplate using classical interferometers for dividing the amplitude of the incident light, which are optionally supplemented by dispersive or diffractive elements, such as, for example. Michelson interferometers, Mach-Zehnder interferometers, Sagnac interferometers, Fabry-Perot interferometers or shearing interferometers. Any arrangement, which generates interference patterns with spatial periods, which the respective detector can resolve is within contemplation for use by the invention. The spatial frequencies occurring at the detector can be selected independently of the wavelength range to be examined in each case by a suitable dimensioning of the apparatus.

The generation of the partial fields by splitting the wavefront, for instance by a Fresnel biprism, by other combinations of prisms or mirrors, with the help of surfaces of irregular shape or likewise with the help of diffractive elements, can furthermore be considered—particularly favorably by the restriction to individual spatial modes of the light field.

The required spectral dispersion can be introduced in all cases by a suitable design of the beam splitter itself or by additional optical elements.

The detector—provided with a suitably small diaphragm—can be moved through the interference pattern (scanning). It is also possible to record the different measurement points successively by moving other components of the apparatus or with the help of an additional movable mirror. This method is particularly applicable for extremely high-resolution measurements or in wavelength ranges for which no suitable spatially resolving detectors are available.

In the one-dimensional case, a suitable diode array or a CCD line may be used as a spatially resolving detector.

The use of two-dimensional detector (CCD or other detectors) is particularly interesting, since in this case a substantially broader range for the properties of the base functions exists on the increase of the number of measured values and the respective correlations can be calculated correspondingly more exactly with "better" linearly independent functions.

III. First Embodiment

FIG. 1 illustrates an extremely compact arrangement of the apparatus of the invention with the optical components being integrated in a monolithic glass block.

According to the invention there is means (M) for coupling in one single spatial mode of an incoming light field. In the shown embodiment said means for coupling in a single mode is implemented using an optical mono mode fibre.

In the shown very compact setup the optical elements (M—mono mode coupler, G—grating, s1—Mirror, s2—Mirror) are shown fixed on a pentagonal mount. The mount may be made of glass or a suitable transparent material.

The light coupling (M) takes place directly from said mono-mode fiber into the monolithic glass block.

The incoming single spatial mode of light is directed to a grating (G). The grating is used as a beam splitter causing the incoming single spatial mode to be split according to amplitude into two partial fields.

The grating creates one part field by diffracting (−1-st order of diffraction) part of the incoming field. The grating creates another part field by reflecting ("0-st" order of diffraction) part of the incoming field. In the shown arrangement the grating resembles a beam splitter splitting amplitude.

The diffracted partial field is directed to a mirror (S1), the reflected partial field is directed to another mirror (S2). The two mirrors are used together with said grating as means for generating an interference pattern by superimposing the partial fields.

The mirrors are applied directly to the glass block.

The mirrors reflect the partial fields back to the grating where the grating superimposes the two partial fields by diffracting part of the pre-reflected partial field in the direction of the detector and also reflecting the pre-diffracted sub field in the direction to the detector. The resulting superposition of the partial fields generates the interference pattern.

At the same time the diffraction grating is used as means for changing the shape and the direction of propagation of both of the partial fields depending on wavelength. The grating functions as a diffractive optical element for changing the shape or the direction of propagation of the wave front.

The diffraction structure (G) acts both as a beam splitter and as a spectrally highly dispersive optical element which changes the wavefront of the diffracted beam in a spectrally dependent manner.

In fact the incoming wave is a single spherical spatial mode. The angle of diffraction at the planar grating depends upon the wavelength. The direction of propagation of the diffracted wave therefore will depend on the wavelength. Further the diffracted wave is also distorted, i.e. changed in shape related to the shown geometry. In fact the width of the diffracted field is has a stretched width.

The resulting superposed fields exit the glass block via a free surface

The resulting interference pattern is recorded by a detector. The detector will measure the intensity of the interference pattern at a plurality of spatial positions and the measurement values will be the base of numerical calculations to reconstruct the spectral properties of the incoming light.

In the shown embodiment the detector is scanning, i.e. is moved through the interference pattern with respect to a single spatial degree of freedom for recording an intensity of the interference pattern at a plurality of discrete spatial positions.

The detector (D) has a small spatial extent or has a suitable diaphragm and is located, on a movable arm, shown with a center of motion (P).

In the shown embodiment the movement of the detector is done by mechanical means comprising an motor R and an excentric X. The measured values are then transferred to means for numerical processing (not shown) to determine spectral properties of the incoming light by the claimed methods of calculation.

According to the method a numerical representation of said interference pattern using the values of said measured values of the intensity of said interference pattern; will be generated. The numerical calculation of an optical spectrum or spectral properties of the light is then performed by correlating said numerical representation of said interference pattern with certain base patterns; wherein said base patterns correspond to numerical representations of said interference patterns for corresponding basic spectral features.

IV. Second Embodiment

Figure 2:
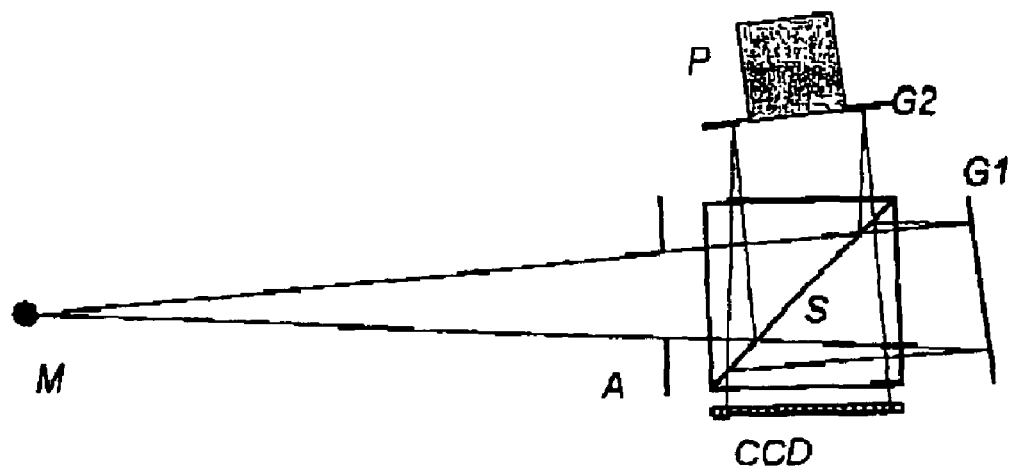
FIG. 2 illustrates an apparatus of the invention that uses a separate beam splitter (S) for the division of the amplitude of the waves and two dispersive elements (G1, G2) in the arms of the interferometer, according to one embodiment.

Referring now to FIG. 2, there is shown an arrangement that uses a separate beam splitter (S) for the division of the amplitude of the waves and two dispersive elements (G1, G2) in the arms of the interferometer.

According to the invention there is means (M) for coupling in one single spatial mode of an incoming light field. In the shown embodiment said means is a spatial filter i.e. implemented as pinhole.

Said incoming single spatial mode of light is directed to a beam splitter (S) passing an aperture (A). An aperture diaphragm (A) as shown is advantageous to limits the numerical aperture of the incoming light in order to avoid stray light.

The shown beamsplitter is implemented as cubic splitter using a semitransparent mirror. The incoming single spatial mode of light is split by amplitude into two partial fields.

One of the partial fields is the part of the field passing the semitransparent mirror. This partial field is directed to a first grating (G1). The other partial field is the part of the field reflected by the semitransparent mirror. This partial field is directed to a second grating (G2).

The gratings are arranged to diffract the fields back to the beamsplitter (S). (Littrow-configuration of a grating). The angle of the diffraction is strongly dependent on wavelength. Therefore depending on the wavelength the fields going back to the beamsplitter show an angular deviation depending on wavelength. Furthermore for reasons of geometry the diffracted fields show a distortion.

The beamsplitter will then generate a superposition of the diffracted fields by reflecting part of the partial field diffracted by the first grating (G1) to the detector and transmitting part of the partial field diffracted by the second grating (G2) also to the detector. The resulting superposition of the partial fields generates the interference pattern.

This resulting interference pattern is recorded by a detector. The detector (CCD) is shown implemented as a spatially resolving detector, The detector will measure the intensity of the interference pattern at a plurality of spatial positions and the measurement values will be the base of numerical calculations to reconstruct the spectral properties of the incoming light.

The measured values are then transferred to means for numerical processing (not shown) to determine spectral properties of the incoming light by the claimed methods of calculation.

The presently described embodiment further uses an phaseshifter (P) implemented as an actuator for translating the attached second grating (G2). An phaseshift of the partial field is performed by translation of the second grating (G2) using the Actuator.

By making use of the means (M) for coupling in one single spatial mode of an incoming light field the embodiments including the presently described configuration are advantageously able to operate without the need of a Fourier transform optical system and without needing any imaging optical elements. Because said coupling in of a single spatial mode guarantees spatial coherence the embodiments are not dependent on the translation invariance of the Fourier transformation to generate unambiguous interference pattern.

The evaluation of the interference patterns, which are generated by such an arrangement, cannot be performed using a numerical Fourier transformation. Instead, the methods described herein are required to evaluate said interference patterns. by correlating them with certain base patterns; wherein said base patterns correspond to basic spectral features to be detected.

The arrangement shown in FIG. 2 uses a spatially resolving detector (CCD). A phase modulator (P) for instance in the form of the piezo-actuator symbolized in FIG. 2, has a particularly advantageous effect.

V. Third Embodiment

The embodiments shown above are advantageous because they are not dependent on imaging optical elements.

Another advantage of the invention resulting from coupling in a single spatial mode is the possibility to employ means for dividing the wavefront of the single spatial mode to generate the partial fields. One skilled in the art will recognize advantages associated with using a wave front splitter instead of an amplitude splitter to allow for a broad range of new advantageous embodiments.

Figure 3:
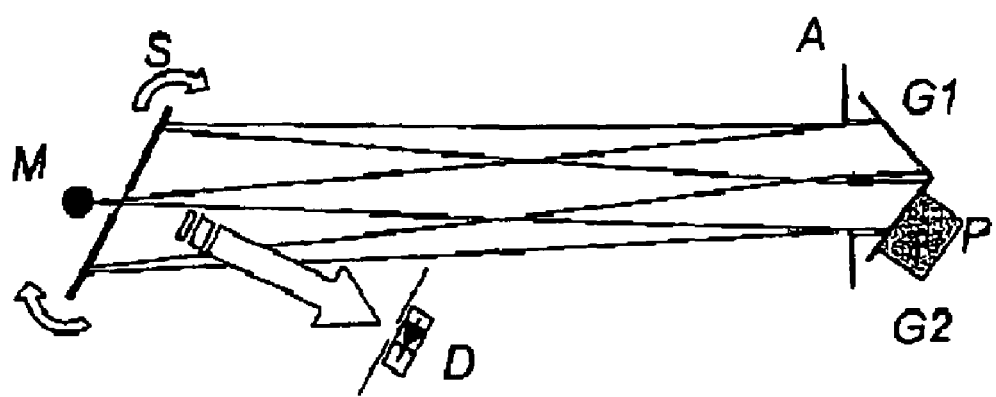
FIG. 3 illustrates an apparatus of the invention that uses a wavefront splitter based on two optical gratings (G1,G2) for the division of the wavefront while said gratings (G1,G2) at the same time are used as spectrally dispersive elements, according to one embodiment.

Referring now to FIG. 3, there is shown an arrangement that uses a wavefront splitter based on two optical gratings (G1,G2) for the division of the wavefront while said gratings (G1,G2) at the same time are used as spectrally dispersive elements.

According to the invention there is means (M) for coupling in one single spatial mode of an incoming light field. In the shown embodiment said means is a spatial filter i.e. implemented as pinhole.

In the arrangement shown, the mirror (S) has a suitable opening through which said coupled in one single spatial mode can pass.

Passing an aperture (A) said incoming single spatial mode of light is directed to said combination of two gratings (G1, G2). The aperture just limits the numerical aperture of the incoming light to avoid stray light.

A portion of the wave is incident to a first diffraction grating (G1), another portion is incident to a second diffraction grating (G2), thus splitting the wavefront. The use of two combined gratings serves as a beam splitter for splitting the wavefront of the incoming single spatial mode of light in to a first partial field handled by one of the two grating (G1) and another partial field handled by the other grating (G2).

The gratings (G1) and (G2) are arranged to diffract the fields back (Littrow-configuration of a grating) to a tiltable mirror (S) and generate a superposition of the partial fields.

The angle of the diffraction is strongly dependent on wavelength. Therefore depending on the wavelength the fields diffracted to said mirror (S) show an angular deviation depending on wavelength. Furthermore for reasons of geometry the diffracted fields show a distortion.

While the gratings (G1) and (G2) introduce a strong angular deviation of the fields depending on wavelength it is a assumed that within a spectral range of the device the total deviation will stay small enough to allow a superposition of at least part of the partial fields. In the case where the angular deviation is too strong, the fields will miss each other and the detector and be out of spectral range. This can be compensated for by rearranging the angular position of the gratings.

The mirror (S) reflects the partial fields in a direction towards the detector (D) where the superposition of the partial fields will generate the interference pattern. This resulting interference pattern is recorded by a detector.

In the presently described embodiment, the interference pattern itself is moved over the detector (scanned) by tilting said mirror (S). Each angular position of the tillable mirror represents a certain spatial position of the interference pattern hitting the detector.

The detector will thus measure the intensity of the interference pattern at a plurality of spatial positions and the measurement values will be the base of numerical calculations to reconstruct the spectral properties of the incoming light.

The measured values are transferred to means for numerical processing (not shown) to determine spectral properties of the incoming light by the claimed methods of calculation.

The presently described embodiment further uses an phaseshifter (P) implemented as actuator translating the attached grating (G2) for example, embodied as piezo-actuator as shown. A phaseshift of the partial field is performed by translation of the grating (G2) using the Actuator.

The performance capability of the apparatus and associated methods described herein can be substantially improved if the relative phase position of the partial fields can be suitably influenced.

This can take place, for instance, by the use of a mirror or a grating which is linearly displaceable over a path in the order of magnitude of the wavelength and by which the relative phase position of the reflected light can be changed with high precision or, e.g. in the case of a design in the manner of a shearing interferometer or, e.g. in the case of a grating with a plurality of spatial frequency components as beam splitters, by a suitable "lateral" displacement of the components.

In an alternative arrangement to generate different interference patterns according to phaseshifts, a spatial displacement of the coupling device (M) is used.

The interferometric apparatus may further take advantage of differences in the optical path lengths, at which the partial fields are brought to interference. The interference patterns are then introduced only by components of the incident light with a high coherence length or the respective small bandwidth corresponding to the differences in the optical path lengths.

One of the key features of all described embodiments is that an interference signal is only generated when the incident radiation shows coherence properties or autocorrelations properties within the range of the optical path length differences.

For use in the field of optical spectroscopy, line spectra can be selectively recorded in this manner. In this case, only components of the incident radiation in a spectrally small band and with a correspondingly large coherence length contribute to the signal measured.

For use in the field of optical data transmission, carriers with defined autocorrelation properties can be selectively recorded or measured. This is in particular interesting for an application in the field of coherence length multiplexing. A special advantage that may be realized for both areas of application lies in the fact that the spectral resolution (spectroscopy) or bandwidth (data transmission) can be set independently of the line width to be selected (spectroscopy) or of the autocorrelation length (data transmission).

VI. Fourth Embodiment

Figure 4:
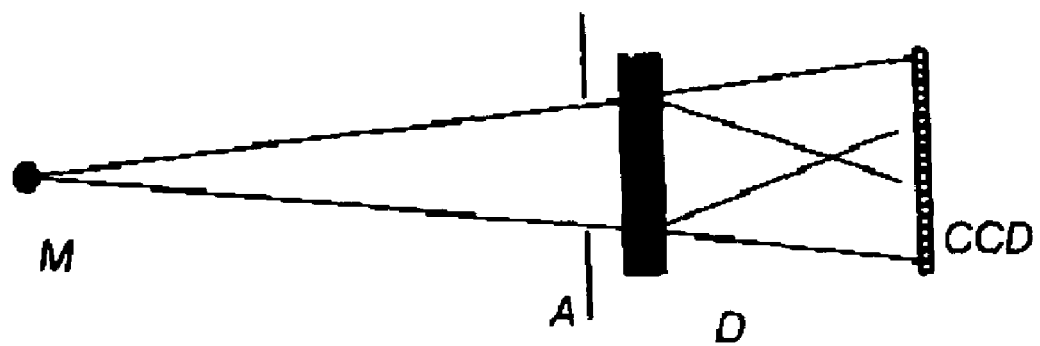
FIG. 4 illustrates an apparatus of the invention that couples a single spatial mode of an incoming light field and splits a wavefront of the incoming single spatial mode of light in to a multitude of subfields showing different dependencies on wavelength, according to one embodiment.

FIG. 4 illustrates an extremely compact and cost-effective configuration of the apparatus of the invention.

According to the invention there is means (M) for coupling in one single spatial mode of an incoming light field. In the shown embodiment said means is a spatial filter i.e. implemented as pinhole.

Passing an aperture (A) said incoming single spatial mode of light is directed to a dispersive or diffractive optical element (D) resembling a diffuser with a granularity of a suitable order of magnitude or an array of small optical diffractive or dispersive elements.

The aperture (A) just limits the numerical aperture of the incoming light to avoid stray light.

The dispersive or diffractive optical element (D) will split the wavefront of the incoming single spatial mode of light in to a multitude of partial fields showing different dependencies on wavelength.

The variant shown expediently has an image-providing detector (CCD).

Instead of using as shown a diffractive optical element (D) as a diffuser, depending on the application, other diffractive elements may be used which can generate a highly structured interference field.

Optionally, different interference fields can be generated by a spatial displacement of the coupling or a displacement or tilting of the diffuser.

At the position of the detector (CCD) the superposition of the multitude of partial fields will generate a complex and highly structured interference pattern ("speckle pattern") This resulting interference pattern is recorded by the detector.

The detector (CCD) is shown implemented as a spatially resolving detector, For the embodiment shown a 2 dimensional CCD is a preferred detector.

This arrangement is expediently operated with a very high number of measurement points for the interference pattern to support the numerical calculation of an optical spectrum or spectral properties of the light by correlating said interference pattern with certain base patterns according to the above illustrated method.

The detector will measure the intensity of the interference pattern at a plurality of spatial positions and the measurement values will be the base of numerical calculations to reconstruct the spectral properties of the incoming light.

The measured values are transferred to means for numerical processing (not shown) to determine spectral properties of the incoming light by the claimed methods of calculation.

VII. Fifth Embodiment

Figure 5:
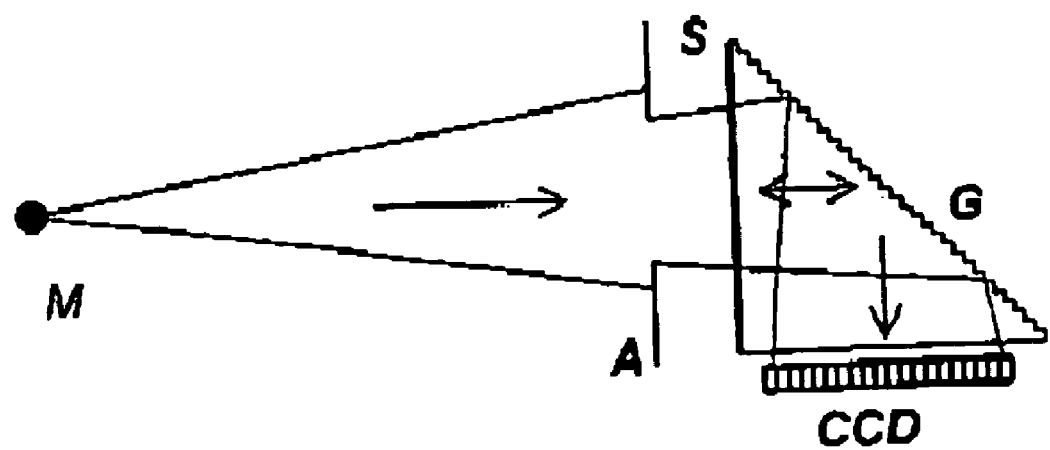
FIG. 5 illustrates an apparatus of the invention in which a plurality of subfields is generated and superimposed using an optical resonator, according to one embodiment.

FIG. 5 illustrates an arrangement in which a plurality of subfields is generated and superimposed using an optical resonator.

According to the invention there is means (M) for coupling in one single spatial mode of an incoming light field. In the shown embodiment said means is a spatial filter i.e. implemented as pinhole.

Said incoming single spatial mode of light is directed to a semitransparent mirror (S) passing an aperture (A). The aperture just limits the numerical aperture of the incoming light to avoid stray light.

Part of said incoming single spatial mode of light passes said semitransparent mirror (S) and propagates to the grating (G).

The resonator is formed by said semitransparent mirror (S) and said grating (G) which simultaneously serves as a beam splitter and a diffractive element. The field is coupled via the beam splitter (S) into the resonator; the resulting interference field in the direction of the detector (CCD) is uncoupled via said grating (G).

In the shown arrangement the grating resembles a beam splitter splitting amplitude.

The grating splits the single permitted spatial mode of an incoming light field into two subfields: A first sub field is generated by reflection at the grating ("0-order of Diffraction") and is directed to the detector (CCD), a second sub field is generated by diffraction at the grating ("–1-st-order of Diffraction") and is directed back to the semitransparent mirror (S).

By the semitransparent mirror a part of the first sub field is reflected back to the gating (G) again, where it is split again. One of the resulting further subfields is generated by reflection at the grating and directed to the detector bringing it to superposition with the first subfield. The other of the resulting further subfields is generated by diffraction and directed back to the semitransparent mirror (S) where the process repeats.

Thus the semitransparent mirror (S) and the grating (G) collectively form an optical resonator. Each iteration generates a further subfield directed to the detector. The resulting superposition of multiple subfields generates the interference pattern.

At the same time the grating represents means for changing the shape or the direction of propagation of the wavefront of at least one of the partial fields in dependence on the wavelength causing different spectral components of the single spatial mode of an incoming light field with different wavelengths to generate different of the interference pattern.

This resulting interference pattern is recorded by a detector. The detector (CCD) is shown implemented as a spatially resolving detector, A 2-dimensional spatially resolving detector is preferable.

The detector will measure the intensity of the interference pattern at a plurality of spatial positions and the measurement values will be the base of numerical calculations to reconstruct the spectral properties of the incoming light. The measured values are transferred to means for numerical processing (not shown) to determine spectral properties of the incoming light by the claimed methods of calculation.

VIII. Sixth Embodiment

Figure 6:
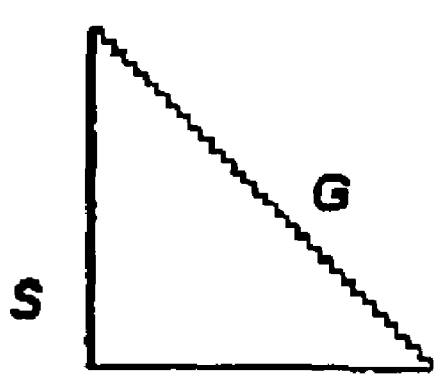
FIG. 6 illustrates an apparatus of the invention in which a semitransparent mirror (S) and a diffractive grating (G) are realized on two surfaces of a prism, according to one embodiment.
Figure 6:
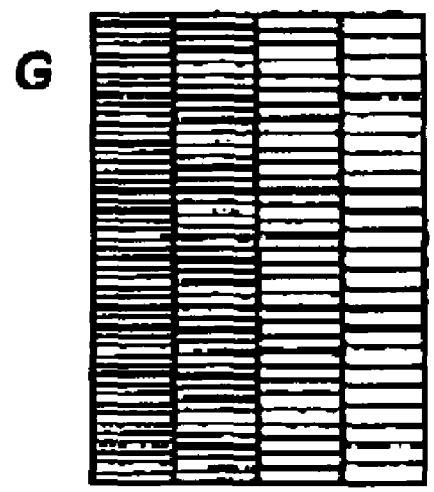

FIG. 6 illustrates, in addition to simple gratings, on the one hand, and complex diffraction structures, on the other hand, multiplex gratings (i.e., a superimposition of a plurality of spatial frequencies) or gratings sub-divided a plurality of times. The multiplex gratings are also suitable as a diffractive element.

A preferred implementation of the arrangement as show in FIG. 5 is implemented using a prism shaped glass block as mount for the semitransparent mirror (S) and the grating (G) as shown in FIG. 6.

The prism as shown in FIG. 6 (left side) can carry said semitransparent mirror (S) and said grating (G) on surfaces as shown. Furthermore it may use instead of a single grating one of a combination of gratings or a multiplex grating or a multiplex hologram or a holographic optical element or a computer-generated hologram.

FIG. 6 (right side) illustrates a diffractive optical element which is a combination of several subgratings.

In the shown embodiment the diffractive element (G) is realized by strip-like gratings with different grating constants disposed next to one another. The part of the field reflected by the respective gratings (0th order of diffraction) exits the resonator, whereas the part of the light field diffracted by the gratings (requiring a suitable wavelength) initially remains in the resonator and again partially reaches the diffractive element after reflection by said semi transparent mirror (S) as explained above.

The technical design of the resonator in this embodiment is of subordinate importance. In addition to simple resonators having only two components, all types of resonators, in particular also ring cavities, can be considered.

Very complex interference patterns result from the shown multiple superposition of a multitude of the generated subfields. The numerical calculation of an optical spectrum or spectral properties of the light by correlating (cross-correlation) the interference pattern with certain base patterns according to the above illustrated methods benefit by using the complex interference patterns.

In further embodiments, the apparatus may include means for the rotation of the interferometer or means for changing selecting the angle of incidence which permits an adjustment of the spatial frequency or spatial frequencies of the generated interference pattern.

The wavelength range, which the arrangement can detect without moving parts, is facilitated by the detector which detects the corresponding spatial frequencies in the interference pattern. It can be of particular advantage to select a wavelength range, by a rotation of the interferometer as a whole or by a suitable change of the angle of incidence. In this embodiment, the interferometer itself operates without any moving elements—with the exception of the optionally required means for phase modulation—and can nevertheless be used for different wavelength ranges according to different of said subgratings.

In still further embodiments, it is contemplated to use a dieder or retroreflector as part of the interferometric setup.

IX. Seventh Embodiment

Figure 7:
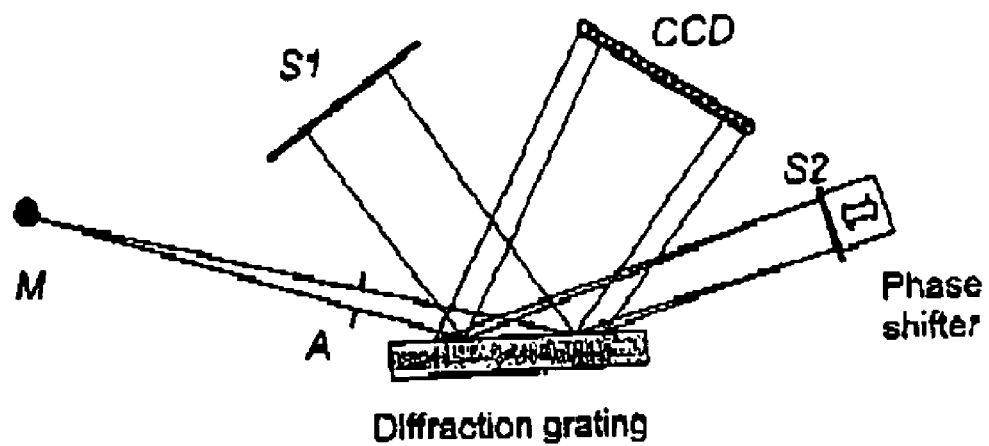
FIG. 7 illustrates an apparatus of the invention in which a single spatial optical mode is coupled in and split into subfields while simultaneously introducing variations of the wavefront of the subfields depending on wavelength, according to one embodiment.

FIG. 7 shows a particularly advantageous embodiment of the apparatus of the invention.

According to the invention there is means (M) for coupling in one single spatial mode of an incoming light field. In the shown embodiment said means is a spatial filter i.e. implemented as pinhole.

Said incoming single spatial mode of light is directed to a grating or diffractive structure(G). Holographic optical elements can be used very advantageously at this point.

The shown aperture (A) just limits the numerical aperture of the incoming light to avoid stray light.

The grating is used as a beam splitter and the incoming single spatial mode is splitted by amplitude into two partial fields. The grating creates one part field by diffracting (−1-st order of diffraction) part of the incoming field. The grating creates another part field by reflecting ("0-st" order of diffraction) part of the incoming field.

In the shown arrangement the grating resembles a beam splitter splitting amplitude.

The diffracted subfield is directed to a mirror (Si), the reflected subfield is directed to another mirror (S2).

Those mirrors are used together with the grating as means for generating an interference pattern by superimposing the part fields. The mirrors reflect the partial fields back to the grating and the grating will superimpose the two fields by diffracting part of the beforehand reflected sub field in the direction to the detector and reflecting the beforehand diffracted sub field also in the direction to the detector.

The resulting superposition of the partial fields generates the interference pattern.

At the same time the diffraction grating is used as means for changing the shape and the direction of propagation of both of the partial fields depending on wavelength.

In fact the incoming wave is a single spherical spatial mode. The angle of diffraction at the planar grating depends upon the wavelength. The direction of propagation of the diffracted wave therefore will depend on the wavelength. Further the diffracted wave is also distorted, i.e. changed in shape related to the shown geometry. In fact the width of the diffracted field is has a stretched width.

The resulting interference pattern is recorded by a detector. The detector will measure the intensity of the interference pattern at a plurality of spatial positions.

The measured values are transferred to means for numerical processing (not shown) to determine spectral properties of the incoming light by the claimed methods of calculation as explained above.

The embodiment further uses a phaseshifter (P) implemented as actuator translating the attached mirror (S2). A phaseshift of the according subfield is done by translation of the grating using the actuator.

X. Eighth Embodiment

Figure 8:
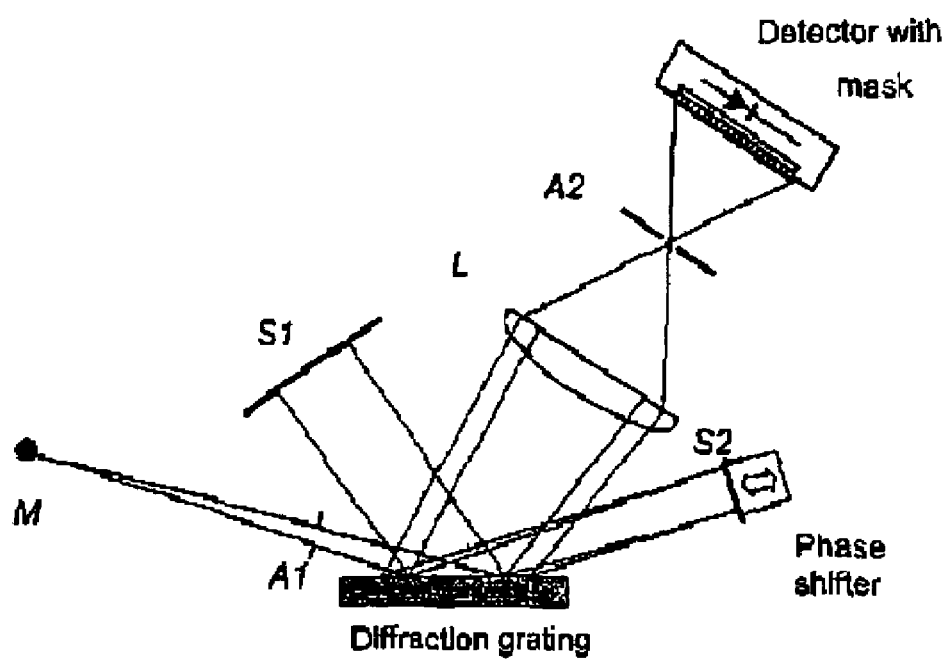
FIG. 8 illustrates an arrangement of the apparatus of the invention in which a single spatial optical mode is coupled in and split into subfields while simultaneously introducing variations of the wavefront of the subfields depending on wavelength, according to one embodiment.

A preferable embodiment to realize a optical sensor to quantify certain spectral properties of incoming light is shown in FIG. 8.

According to the invention there is means (M) for coupling in one single spatial mode of an incoming light field. In the shown embodiment said means is a spatial filter i.e. implemented as pinhole.

Said incoming single spatial mode of light is directed to a grating (G) passing an aperture (A1). The aperture just limits the numerical aperture of the incoming light to avoid stray light.

The grating is used as a beam splitter and the incoming single spatial mode is split by amplitude into two partial fields.

The grating creates one part field by diffracting (−1-st order of diffraction) part of the incoming field. The grating creates another part field by reflecting ("0-st" order of diffraction) part of the incoming field.

In the shown arrangement the grating resembles a beam splitter splitting amplitude.

The diffracted subfield is directed to a mirror (S1), the reflected partial field is directed to another mirror (S2).

Those mirrors are used together with the grating as means for generating an interference pattern by superimposing the part fields. The mirrors reflect the subfields back to grating and the grating will superimpose the two fields by diffracting part of the beforehand reflected partial field in the direction to the detector and reflecting the beforehand diffracted subfield also in the direction to the detector.

The resulting superposition of the partial fields generates the interference pattern.

At the same time the diffraction grating is used as means for changing the shape and the direction of propagation of both of the partial fields depending on wavelength.

The incoming wave is a single spherical spatial mode. The angle of diffraction at the planar grating depends upon the wavelength. The direction of propagation of the diffracted wave therefore will depend on the wavelength. Further the diffracted wave is also distorted, i.e. changed in shape related to the shown geometry. In fact the width of the diffracted field is has a stretched width.

An additional transfer lens (L) will project said interference pattern via an second aperture (A2) onto a detector.

In case said lens (L) is arranged to generate an image of the pinhole (M) in the plane of said second Aperture (A2) said Aperture may be used to limit the spectral range of fields propagating to the detector. The aperture (A2) by this restricts the variability of the interference patterns, which may occur at the detector, which can be advantageous for the recognition of spectral features.

At the same time said lens (L) may be used to change the scale of the interference pattern.

The resulting interference pattern is recorded by dection means for recording a weighted sum of the intensities of said interference pattern at a plurality of discrete spatial positions in order to identify an optical spectrum or spectral properties of said incoming light field according to a predetermined set of said weights.

Those means for recording a weighted sum of the intensities are implemented by using a suitable mask in front of a spatially integrating detector (Detector with mask). Said mask representing a spatial distribution of different absorption correlates with at least one generated interference pattern representing the spectral features to be detected.

The detector output will have a direct correlation to the intensity of said spectral features of the incoming light.

The embodiment further uses an phaseshifter (P) implemented as actuator translating the attached mirror (S2). A phaseshift of the partial field is performed by translation of the grating using the actuator.

The evaluation of the interference pattern i.e. the performing of the correlation required for a comparison of a measured interference pattern with the interferometric pattern known for a specific spectral component or for a group of spectral components in this case is performed optically with the help of said mask and, optionally, suitable phase modulation or another form of detuning of the interferometer.

The interference patterns of a spectral fingerprint with a plurality of spectral components can in particular be already contained in a single mask.

The multiple recording of the interference pattern through the mask positioned in front of the detector at different relative phase positions of the partial beams shows a strong dependence of the respectively measured integrated total intensity of the signal on the relative phase position only for those spectral components of the incident light with whose interference patterns the mask correlates.

A direct optical correlation is much superior to numerical methods under favorable circumstances.

This form of the arrangement becomes particularly interesting with the use of a variable mask, for instance of an LCD screen (spatial light modulator, SLM).

A variable amplitude mask (SLM) which can show different samples for optical correlation can be easily impolemented since the mask is not part of the actual interferometer but part of the detector.

In accordance with a further advantageous aspect of the invention, the change of the relative phase position of the interfering part fields and the change of the spatial frequency or spatial frequencies of the generated interference pattern takes place jointly by a movement of at least one component of the apparatus.

It is advantageous to make measurements at different relative phases of the partial fields. If the optical path lengths of the partial fields are not equal and/or if the tiling of the optical elements results in a change of the difference of the optical path lengths of the partial fields, the relative phase position of the interference pattern also changes on the setting of the wavelength. This effect can be utilized directly for the measurement of the different phase positions. This is particularly advantageous in the design of the apparatus of the invention, since a separate mechanism for the modulation of the phase position can then be omitted.

The rotation of one of the optical elements about a support point P outside the beam path simultaneously effects a change of the optical path length and thus a modulation of the relative phase position in addition to the change in the angle and thus to the setting of the selected wavelength.

In the various embodiments described herein, the spectrally dispersive or diffractive element may be advantageously embodied as a multiplex grating, a multiplex hologram, a holographically optical element or a computer-generated hologram (CGH).

When a two-dimensionally resolving detector is used, it can be particularly advantageous to use spectrally dispersive elements which do not only effect a simple deflection of the respective partial beam.

The generation of complicated interference patterns appears advantageous in particular in connection with the correlation methods shown. Such complex patterns optionally show a more sharply defined correlation signal than simple strips patterns.

When a periodic diffraction grating is used, the positions of equal optical path length and thus the maximum amplitude or modulation for the different wavelengths lie (in contrast to a normal Fourier transform spectrum!) at different positions of the detector. This has a favorable effect on the required dynamic range of the detector element.

Special diffraction gratings can be used—as also in the other arrangements in accordance with the invention—for special applications. For instance in chemometrics, the detection of a substance by the determination of spectral "fingerprints" within specific ranges of an absorption spectrum, or the simultaneous determination of specific spectral lines, is feasible.

Beside using spatially separate or spatially superimposed multiple gratings and, optionally, an arrangement having a plurality of detectors, holographic elements can also be considered here which can e.g. diffract whole groups of different spectral lines at the same angle. This variant can be used particularly favorably when a detector is used which uses a mask for the detection of patterns (optical correlation method).

The invention claimed is:

1. An interferometric apparatus for performing optical spectroscopy with high spectral resolution in a compact arrangement, the apparatus comprising:
    (a) means for coupling in a single spatial mode of an incoming light field to be examined;
    (b) means for splitting said single spatial mode of said incoming light field into at least two partial fields;
    (c) means for changing the wavefront of at least one of said at least two partial fields in dependence on the wavelength;
    (d) means for generating an interference pattern by superimposing said at least two partial fields;
    (e) detection and analysis means to record and evaluate said interference pattern at a plurality of discrete spatial positions in order to derive spectral properties of said incoming light field.

2. An interferometric apparatus in accordance with claim 1, wherein said detection and analysis means to record and evaluate said interference pattern comprises detection means for recording an intensity of said interference pattern at a plurality of discrete spatial positions; and numerical analysis means for reconstructing an optical spectrum or spectral properties of said incoming light field by performing calculations on said recorded intensities.

3. An interferometric apparatus in accordance with claim 1, wherein said detection and analysis means to record and evaluate said interference pattern comprises detection means for recording a weighted sum of the intensities of said interference pattern at a plurality of discrete spatial positions in order to identify an optical spectrum or spectral properties of said incoming light field according to a predetermined set of said weights.

4. An interferometric apparatus in accordance with claim 3, wherein said detection means for recording a weighted sum of the intensities includes a spatial mask which correlates with at least one generated interference pattern to be detected.

5. An interferometric apparatus in accordance with claim 4, wherein said spatial mask is one of a fixed form and a changeable form.

6. An interferometric apparatus in accordance with claim 1, wherein said means for splitting said single spatial mode of said incoming light field into said at least two partial fields further comprises means for dividing the amplitude of said single spatial mode of said incoming light field into at least two partial fields.

7. An interferometric apparatus in accordance with claim 1, wherein said means for splitting said single spatial mode of said incoming light field to at least two partial fields further comprises means for dividing the wavefront of said single spatial mode of said incoming light field into said at least two partial fields.

8. An interferometric apparatus according to claim 1, wherein said means for coupling in said single spatial mode of an incoming light field to be examined, comprises a spatial filter configured to permit a single spatial mode.

9. An interferometric apparatus according to claim 1, wherein said means for coupling in said single spatial mode of an incoming light field to be examined, further comprises an optical mono mode fiber.

10. An interferometric apparatus according to claim 1, wherein said means for changing the shape or the direction of propagation of the wavefront of at least one of said two partial fields in dependence on the wavelength comprises a spectrally dispersive optical element.

11. An interferometric apparatus according to claim 1, wherein said means for changing the shape or the direction of propagation of the wavefront of at least one of said two partial fields in dependence on the wavelength comprises a diffractive optical.

12. An interferometric apparatus in accordance with claim 11, wherein said diffractive optical element has non-periodic diffraction structures.

13. An interferometric apparatus in accordance with claim 11, wherein said diffractive element is selected from the group consisting of: a multiplex grating, a multiplex hologram, a holographic optical element, and a computer-generated hologram.

14. An interferometric apparatus in accordance with claim 1, wherein said means for splitting said single spatial mode of an incoming light field into said at least two partial fields and said means for changing the shape or the direction of propagation of the wavefront of at least one of said two partial fields in dependence on the wavelength share at least one common optical element.

15. An interferometric apparatus in accordance with claim 1, wherein the detection means is configured to move through the interference pattern with respect to a single spatial degree of freedom for recording an intensity of said interference pattern at said plurality of discrete spatial positions.

16. An interferometric apparatus in accordance with claim 1, wherein the detection means is moved through the interference pattern with respect to two spatial degrees of freedom for recording an intensity of said interference pattern at said plurality of discrete spatial positions.

17. An interferometric apparatus in accordance with claim 1, wherein the interference pattern is directed onto the detection means via optical elements moveable with respect to one spatial degree of freedom for recording an intensity of said interference pattern at said plurality of discrete spatial positions of said interference pattern.

18. An interferometric apparatus in accordance with claim 1, wherein the interference pattern is directed onto the detection means via optical elements moveable with respect to two spatial degrees of freedom for recording an intensity of said interference pattern at said plurality of discrete spatial positions of said interference pattern.

19. An interferometric apparatus in accordance with claim 1, wherein the detection means is one of a spatially one-dimensional resolving detector or a one-dimensional detector array for recording said intensities of said interference pattern at said plurality of discrete spatial positions.

20. An interferometric apparatus in accordance with claim 1, wherein the detection means is one of a spatially two-dimensional resolving detector or a two-dimensional detector array for recording said intensities of said interference pattern at said plurality of discrete spatial positions.

21. An interferometric apparatus in accordance with claim 1, further comprising means to change the optical path length for at least one of said partial fields before being superimposed to generate said interference pattern.

22. An interferometric apparatus in accordance with claim 1, further comprising means to influence the optical path length for at least one of said partial fields before being superimposed to generate said interference pattern in dependence on the wavelength.

23. An interferometric apparatus in accordance with claim 1, further comprising means to shift or modulate the relative phase of at least one of said at least two partial fields with respect to at least one other of said at least two subfields being superimposed to generate said interference pattern.

24. An interferometric apparatus in accordance with claim 1, further comprising means to change or modulate a spatial position of at least one of said two partial fields with respect to at least one other of said at least two partial fields.

25. An interferometric apparatus in accordance with claim 1, further comprising means to change or modulate the spatial position of said single spatial mode of said incoming light field.

26. An interferometric apparatus in accordance with claim 1 further comprising means to form an optical resonator.

27. An interferometric apparatus in accordance with claim 26, wherein one or more of said means for changing one of a shape or a direction of propagation of the wavefront of at least one of said at least two partial fields in dependence on the wavelength are arranged at the interior of said resonator.

28. An interferometric apparatus in accordance with claim 1, wherein said means for generating an interference pattern by superimposing said at least two partial fields comprises one of a retroreflector or a right angle prism.

29. An interferometric apparatus in accordance with claim 1, wherein said means for generating an interference pattern by superimposing said at least two partial fields further comprises means for rotating at least one optical component to adjust spatial frequencies of said generated interference pattern.

30. An interferometric apparatus in accordance with claim 29, wherein said means for rotating at least one optical component causes one of a simultaneous shift or modulation of the relative phase of at least one of said at least two partial fields with respect to at least one other of said at least two partial fields being superimposed to generate said interference pattern.

31. An interferometric apparatus in accordance with claim 1, wherein said apparatus further comprises one of a spectrally selective filter and a spectrally selective detector.

32. A method for determining one of an optical spectrum of a light field to be examined and spectral properties of the light field to be examined using an interferometric apparatus, the method comprising:
(a) coupling in a single spatial mode of said light field to be examined
(b) splitting said single spatial mode into at least two partial fields (c) generating an interference pattern by superimposing said at least two partial fields
(d) changing the wavefront of at least one of said at least two partial fields in dependence on the wavelength, thereby causing each different spectral component of said single spatial mode of an incoming light field to generate a different of said interference pattern;
(e) calculating one of said optical spectrum or said spectral properties by numerical analysis of said numerical representation of said interference pattern by correlating said numerical representation of said interference with certain base patterns; wherein said base patterns correspond to numerical representations of said interference patterns for corresponding basic spectral features.

33. A method in accordance with claim 32 wherein said calculating step for performing a numerical analysis of said numerical representation of said interference patterns comprises performing one of: a Fourier transformation of said numerical representation, a Hartley transformation of said numerical representation, or a mathematical transformation to represent said interference pattern as a linear combination of sinus or cosinus functions.

34. A method in accordance with claim 32, wherein said calculating step for performing a numerical analysis of said numerical representation of said interference pattern comprises breaking down said interference pattern according to a set of base patterns dependent on said interferometric apparatus.

35. A method in accordance with claim 34, wherein said base patterns required for said decomposition are gained based on a measurement.

36. A method in accordance with claim 35, wherein the determination of said base patterns includes further includes the step of measuring the intensity of different interference patterns according to different relative phase positions of said partial fields.

37. A method in accordance with claim 32, wherein said step of measuring the intensity of an interference pattern at a plurality of discrete spatial positions and said step of generating a numerical representation of said interference pattern using the values of said measurements of the intensity of said interference pattern further includes the step of measuring the intensity of different interference patterns according to different relative phase positions of said partial fields.

38. A method in accordance with claim 34, such that respective numerical transformations of interference patterns and said base patterns are used instead of said numerical representation of interference pattern and said base patterns.

39. A method in accordance with claim 32, further comprising:
determining the difference of the optical path lengths of the partial fields brought to interference for each of the said individual measurement points at a plurality of discrete spatial positions of said interference patterns and
sorting the individual measured values in accordance to the difference of the optical path lengths of the partial fields brought to interference respectively determined from the measurement point.

* * * * *